(12) United States Patent
De Backer (10) Patent No.: US 11,411,379 B2
(45) Date of Patent: Aug. 9, 2022

(54) HEIGHT ADJUSTABLE MOUNTING BOX

(71) Applicant: SHIVER, Aalst (BE)

(72) Inventor: Bart De Backer, Aalst (BE)

(73) Assignee: SHIVER

( * ) Notice: Subject to any disclaimer, the term of this patent is extended or adjusted under 35 U.S.C. 154(b) by 25 days.

(21) Appl. No.: 17/259,890

(22) PCT Filed: Jul. 12, 2019

(86) PCT No.: PCT/IB2019/055963
§ 371 (c)(1),
(2) Date: Jan. 12, 2021

(87) PCT Pub. No.: WO2020/012432
PCT Pub. Date: Jan. 16, 2020

(65) Prior Publication Data
US 2021/0296871 A1    Sep. 23, 2021

(30) Foreign Application Priority Data

Jul. 13, 2018 (BE) .................................. 2018/5511

(51) Int. Cl.
*H02G 3/08* (2006.01)
*H02G 3/12* (2006.01)

(52) U.S. Cl.
CPC .............. *H02G 3/086* (2013.01); *H02G 3/081* (2013.01); *H02G 3/121* (2013.01)

(58) Field of Classification Search
CPC .......... H02G 3/086; H02G 3/12; H02G 3/121; H02G 3/123; H02G 3/08; H05K 5/0204
See application file for complete search history.

(56) References Cited

U.S. PATENT DOCUMENTS

| 3,884,441 A | * | 5/1975 | Barry | ..................... | H02G 3/123 |
| | | | | | 248/27.1 |
| 4,023,697 A | * | 5/1977 | Marrero | ................. | H02G 3/125 |
| | | | | | 220/3.7 |

(Continued)

FOREIGN PATENT DOCUMENTS

| EP | 2876758 A1 | 5/2015 |
| WO | 2014096678 A1 | 6/2014 |
| WO | 2017037385 A1 | 3/2017 |

OTHER PUBLICATIONS

International Search Report and Written Opinion dated Oct. 14, 2019, in international application No. PCT/IB2019/055963, filed Jul. 12, 2020, 8 pages.

(Continued)

*Primary Examiner* — Hoa C Nguyen
*Assistant Examiner* — Amol H Patel
(74) *Attorney, Agent, or Firm* — Christensen O'Connor Johnson Kindness PLLC (57) ABSTRACT

A mounting box for mounting an electrical device into a cavity of a wall has an outer body having an expansion element arranged in a side wall that extends in a depth direction, wherein, in use, the expansion element is pressed against the cavity, the mounting box having a first expansion control element arranged for pressing the expansion element against the cavity from a resting state to a securing state, and wherein the mounting box further includes an inner body, arranged to be mounted into the outer body and arranged for receiving the electrical device, wherein the inner body has adjustment means for moving the inner body in the depth direction inside the outer body regardless of the condition of the expansion element.

16 Claims, 8 Drawing Sheets

(56) References Cited

U.S. PATENT DOCUMENTS

| | | | | | |
|---|---|---|---|---|---|
| 4,693,438 | A | * | 9/1987 | Angell | H02G 3/123 |
| | | | | | 220/3.6 |
| 7,462,775 | B1 | * | 12/2008 | Gretz | H02G 3/16 |
| | | | | | 174/64 |
| 8,415,563 | B1 | * | 4/2013 | Shotey | H02G 3/126 |
| | | | | | 439/535 |
| 8,575,484 | B1 | * | 11/2013 | Witherbee | H02G 3/14 |
| | | | | | 174/58 |
| 9,853,433 | B1 | * | 12/2017 | Gretz | H02G 3/185 |
| 9,887,524 | B1 | * | 2/2018 | Gretz | H02G 3/081 |
| 11,088,516 | B1 | * | 8/2021 | Baldwin | H02G 3/081 |
| 2010/0252552 | A1 | * | 10/2010 | Nikayin | H02G 3/123 |
| | | | | | 220/3.7 |
| 2016/0352087 | A1 | * | 12/2016 | Wurms | H02G 3/12 |
| 2020/0052471 | A1 | * | 2/2020 | Byrne | H01R 27/02 |
| 2020/0169068 | A1 | * | 5/2020 | Zhang | H02G 3/125 |
| 2020/0266616 | A1 | * | 8/2020 | Phillips | H01R 13/746 |

OTHER PUBLICATIONS

International Preliminary Report on Patentability, dated Feb. 6, 2020, received in international application No. PCT/IB2019/055963, filed Jul. 12, 2020, 6 pages.

Belgian Search Report dated Feb. 27, 2019, received in corresponding Belgian application BE 201805511, filed Jul. 13, 2018, 8 pages.

* cited by examiner

HEIGHT ADJUSTABLE MOUNTING BOX

The present invention relates to a mounting box for mounting an electrical device such as a switch or an electrical socket, as well as a wall provided with the mounting box. The present invention also relates to a method for mounting an electrical device into a wall in a time-efficient and aesthetic manner.

PRIOR ART

The present invention relates to the field of construction, in particular to installing electrical devices such as switches or an electrical sockets into a cavity in a wall such as a vertical wall or ceiling. The invention particularly relates to installing mounting boxes for said electrical devices into a wall in the structural construction phase of the construction of a building. Installing electrical devices requires several time-consuming operations and several phases of intervention by experts. In particular, creating the cavity in the wall for accommodating the mounting box, as well as the trenches for accommodating the electrical wiring, requires the intervention of a first expert, for instance a stone grinder. Installing the electrical wiring into the formed trenches, leveling a mounting box inside the cavity and securing the mounting box inside the cavity using cement requires the intervention of another expert, such as an electrician. Applying a finishing layer of a given thickness onto the wall, in particular plastering the wall, should be done by a third expert, for instance by the plasterer. Finally, the electrical device, for instance the switch or the electrical socket, needs to be installed into the mounting box. To this end, yet another expert, such as an electrician, needs to come to the building site, for connecting the electrical devices, which are finally provided with a cover plate for making the transition between the electrical device and the finished wall as aesthetically pleasing and, to this end, as unobtrusive as possible. It is an object of the invention to reduce the number of time-consuming operations and the number of expert intervention phases. It is known from the art, for instance from patent publication WO2014096678, how the number of time-consuming operations and the number of expert interventions may be reduced. The state of the art teaches that the securing of the mounting box by means of cement may be omitted by providing a mounting box comprising an outer body comprising at least one expansion element, provided in a side wall that extends in a depth direction, wherein, in use, the expansion element is pressed against the side wall of the cavity. To this end, the mounting box from the art comprises an inner body arranged for receiving the electrical device, wherein the inner body serves as a first expansion control element arranged for pressing the expansion element against the side wall of the cavity from a resting state to a securing state when the inner body is placed into the outer body. The system from the art offers the possibility to quickly place the mounting box into the cavity of the wall, without having to rely on the drying of the securing cement. Moreover, the mounting box from the art allows the expert installing the mounting box, such as an electrician, to adjust the alignment of the mounting box in a simple manner for placing it level or for adjusting it to requirements according to the orientation of the wall, even if an incorrect alignment is not discovered until some time after the installation of the mounting box.

It turns out, however, that already in the structural construction phase, immediately after installing the mounting boxes, there is a desire to test if the electrical devices, such as an electrical socket or a switch, function correctly. Moreover, there is a wish to be able to use the working electrical devices already during the structural construction phase, so that, for instance, there is already light etc. present in and after the structural phase. Furthermore, it is desirable for the expert, in particular the electrician, who is qualified for installing the electrical wiring and building in the mounting boxes, to also perform other operations for which they are qualified in the same phase, particularly installing the electrical devices, so that the expert does not need to return in a later phase. However, in the mounting boxes from the art, such as those from WO2014096678, the electrical devices will not yet be installed into the mounting boxes during the structural construction phase, since that would mean that in a later phase, for instance by the plasterer or in particular by an unnecessarily returning electrician, it would have to be disconnected again before the plasterer can start plastering. This is because the plasterer has to apply a finishing layer of a certain thickness onto the wall, as a result of which, in case the plasterer or the electrician does not remove the electrical device prior to the plastering, the electrical device would end up recessed with respect to the finished wall. The plasterer would thus be obliged to remove the electrical device, or in particular to have it removed by the electrician, before the plasterer can start plastering. The plasterer would then also be obliged to reinstall the electrical device afterwards, or in particular to have it reinstalled by the electrician. Finally, the plasterer needs to install a cover plate, or have one installed, over the inserted electrical device, for covering the wall surface that is not plastered over and not covered by the electrical device. Removing and reinstalling the electrical device, as well as installing the cover plate, in particular by the same expert, such as the electrician, at different points in time, is a time-consuming and therefore costly process. Furthermore, removing and reinstalling the electrical device, which involves electrical wiring being connected to and disconnected from the electrical device, may be a potentially dangerous process, in particular if it is carried out by non-experts in electrical matters, such as plasterers. For safety reasons, it is thus preferred that the electrician should return in a later phase, after installing the mounting boxes, to remove the electrical device, and again return in an even later phase, after the plastering, to reconnect the electrical device. Furthermore, there is a risk when removing the electrical device, in particular by non-experts in electrical matters, such as plasterers, for the wiring connected to the electrical device, or other things in contact met the wiring, to be damaged. Thus, it may occur that the returning electrician or the plasterer, while removing the electrical device, pulls the wiring too hard, causing it to break unverifiably somewhere inside the wall, or for instance causing an insulation of the electrical wiring to be exposed, for instance because the insulation of the electrical wire snags on element during the pulling. Moreover, it may occur that while the electrical device is being disconnected, for instance by the plasterer or the returning electrician, and in particular in the mounting boxes from the art WO2014096678, the mounting box is pulled out of the wall, which may cause damage to, for instance, the electrical wiring installed from the cavity into the mounting box.

DESCRIPTION OF THE INVENTION

The present invention offers a solution to the problem from the art. In particular, the present invention provides in a mounting box which reduces the number of time-consuming operations and the number of expert interventions for installing electrical devices into a wall, such as a ceiling or a vertical wall. In particular the present invention provides the mounting box which allows the installation of electrical devices into a wall during the structural construction phase in the construction of a building. To this end, the present invention provides in a mounting box according to the first claim, for mounting an electrical device into a cavity of a wall, wherein the cavity is at least provided with a side wall. The mounting box comprises an outer body. The outer body comprises at least one expansion element, provided in a side wall that extends in a depth direction, wherein, in use, the expansion element is pressed against the side wall of the cavity. The outer body thereto further comprises a first expansion control element arranged for pressing the expansion element against the side wall of the cavity from a resting state, wherein the expansion element is, for instance, not expanded relative to the side wall of the outer body, to a securing state, wherein the expansion element is, for instance, expanded relative to the side wall of the outer body. The mounting box further provides an inner body, arranged to be mounted into the outer body and arranged to accommodate the electrical device, wherein the inner body comprises adjustment means, arranged to move the inner body in the depth direction within the outer body, regardless of the condition of the expansion element.

As a result of the inner body being adjustable in the depth direction, the plasterer can easily adjust the depth location of the inner body within the outer body to the thickness of the finishing layer the plasterer wishes to apply to the wall, without having to remove the electrical device/inner body from the outer body. This allows the electrical device to be installed in the mounting box at an early stage, for instance during the structural construction phase, for instance by the electrician while installing the mounting boxes in the wall, so that the electrician no longer needs to return to the construction site in a later phase, saving time and costs. The plasterer can adjust the depth of the inner body without the outer body becoming detached, as the anchoring of the outer body into the wall and the anchoring of the inner body into the outer body can be carried out independently from each other. Another advantage of the mounting box of the present invention is that the electrical device can be placed into the finished wall in an unobtrusive way, since the plasterer can set the depth as a function of the thickness of the finishing layer, so that no finishing plate is required and the electrical device does not end up recessed with respect to the finished wall. Moreover, the mounting box of the present invention ensures that an expert, such as an electrician, can install the electrical device into the wall in a time-efficient manner. Thus, the electrician can easily install the outer body at a correct alignment, for instance level, into a cavity in the wall, since the electrical device together with the inner body has already been placed into the outer body, so that the electrician can perform a simple visual control of the correct alignment of the mounting box in the wall.

In an embodiment of the present invention, the outer body comprises one expansion element, which element is pressed against the side wall of the cavity under the control of the first expansion control element. Part of the side wall of the outer body herein serves as a repulsion body which presses against a first position of the side wall of the cavity in response to the expansion element pressing against a second, different position of the side wall of the cavity. Providing one expansion element offers the advantage that the outer body can easily be secured in the cavity of the wall, as the expansion control element only needs to expand one expansion element. In a further embodiment of the present invention, the outer body comprises a plurality of expansion elements. Providing a plurality of expansion elements offers the advantage that in the securing state, i.e. with the expansion elements in their expanded state, the mounting box can be secured in a larger cavity than a mounting box having a single expansion element. In an embodiment, the plurality of expansion elements are individually controllable by the expansion control element. In an embodiment, the plurality of expansion elements are individually controllable by a plurality of expansion control elements. In an embodiment of the present invention, the expansion element comprises a grip-enhancing surface, for instance a surface provided with a grip-enhancing material or geometry, for instance provided with grooves. Providing a grip-enhancing surface improves the anchoring of the outer body against the side wall of the cavity in the wall.

In an embodiment of the present invention, the side wall of the outer body describes a closed surface. In an embodiment of the present invention, the side wall of the outer body comprises a plurality of faces. In an alternative embodiment of the present invention, the side wall of the outer body has a cylindrical shape. Providing a cylindrical shape offers the advantage that the outer body, regardless of the shape of the cavity in the wall, may be rotated about an axis parallel to the depth direction, so as to level the mounting box. In an embodiment, the expansion control element is arranged for radially expanding the expansion element in relation to the side wall of the outer body. In an embodiment of the present invention, the outer body is provided with an outer wall, which is connected to the side wall of the outer body and has, for instance, a normal according to the depth direction, for instance so as to enclose a volume between the outer wall of the outer body, the side wall of the outer body and the inner body provided inside the outer body. This offers the advantage that moisture is prevented from penetrating the volume, and thus the electrical wires present therein.

In an embodiment of the present invention, the first expansion control element is arranged for expanding the expansion element from a resting state to a securing state, and is also arranged for retracting the expansion element from a securing state to a resting state. As a result, an electrician or a plasterer is able to anchor the outer body in the cavity of the wall, and to release the outer body again from the cavity of the wall, even a long time after the anchoring of the mounting box in the wall. As the anchoring and releasing of the outer body in the cavity of the wall can be carried out with the inner body secured inside the outer body, the electrical device does not need to be decoupled from the electrical wiring, which improves the safety of the system and may avoid the unnecessary return of an electrician. As a result, the electrician or plasterer is able to adjust the alignment of the mounting box, during the initial installation or even some time after the initial installation, for instance to level it or for instance to adjust it to a new alignment, not in the plane of the wall but in the plane of the finished wall, for instance in case the finishing layer on the wall does not have a uniform thickness across the wall, for instance showing a gradient across the wall. In an embodiment of the present invention, the mounting box comprises a plurality of first expansion control elements that, independently from each other, control a respective expansion element. This offers the advantage that, for instance, the mounting box can also be anchored in irregularly shaped cavities, wherein one of the expansion elements for instance needs to be expanded further than another expansion element.

In an embodiment of the present invention, the adjustment means enable an axial rotation of the inner body in relation to the outer body of below 30 degrees, preferably below 15 degrees. The axial rotation is a rotation about an axis parallel to the depth direction, and preferably having its rotation point in the center of gravity of the inner body. The electrical wiring led by the expert, for instance by the electrician, from the cavity into the outer body, preferably through a cable opening in the outer body, is eventually connected by the expert to the electrical device housed on the inner body. In many cases, the connection is a fragile connection which may break with excess rotation of the inner body in relation to the outer body. For that reason, the adjustment means of the present invention only allow a minimal rotation of the inner body in relation to the outer body. In an embodiment of the present invention, the adjustment means arrange the inner body in a non-rotatable way in relation to the outer body. In this way, the risk of breaking of the fragile connection between the electrical wiring and the electrical device is reduced. It is particularly advantageous that, in the mounting box of the present invention, the alignment of the outer body in relation to the wall, and correspondingly the alignment of the inner body in relation to the wall, for instance for leveling it, can still be adjusted even long after the anchoring of the outer body in the cavity of the wall.

In an embodiment of the present invention, the inner body comprises a side wall extending in the depth direction. In an embodiment of the present invention, the side wall of the outer body and the side wall of the inner body are substantially congruous and preferably contiguous. Providing congruous and contiguous side walls allows the plasterer, when applying a finishing layer of a finishing material onto the wall, to apply the finishing layer in a simple manner up to the electrical device housed in the inner body, without the finishing material between the outer body and the inner body disappearing, which could for instance lead to a loss of finishing material as well as damage to the exposed electrical wiring and electronics provided between the inner body and the outer body. In an embodiment of the present invention, the side wall of the inner body forms a closed surface. In an embodiment of the present invention, the side wall of the inner body comprises a plurality of faces. In an alternative embodiment of the present invention, the side wall of the inner body has a cylindrical shape, in particular when the side wall of the outer body also has a cylindrical shape. This embodiment is particularly advantageous if the adjustment means allow a minimal rotation of the inner body in relation to the outer body, as in that case, the cylindrical shapes allow simple rotation. In an embodiment of the present invention, the inner body is provided with an outer wall, which is connected to the side wall of the inner body and which has, for instance, a normal in the depth direction, for instance so as to enclose a volume between the outer wall of the inner body, the side wall of the inner body and the outer body, in particular the outer wall of the outer body and the side wall of the inner body. This offers the advantage that moisture is prevented from penetrating the volume, and thus the electrical wires present therein.

In an embodiment of the present invention, the inner body, for instance the side wall and/or the outer wall of the inner body, is provided with a securing means for securing the electrical device. In an embodiment of the present invention, the electrical device is one of a switch and an electrical socket. The electrical socket comprises conductive pins, for instance an earthing pin and two active conductive pins, provided to be coupled with a cable manager for instance provided with a PCB (Printed Circuit Board), positioned behind the electrical device, for instance attached to the inner body in a recessed position in relation to the securing means. The switch in principle does not comprise any conductive pins and is only arranged for switching a circuit, for instance provided on a cable manager, for instance provided with a PCB, positioned behind the electrical device, for instance attached to the inner body in a recessed position in relation to the securing means. In an embodiment, the securing means comprises snap elements, for instance a rigidly arranged anchoring opening, arranged for snap-fitting, for instance removably snap-fitting, the electrical device, which is for instance provided thereto with complementary snap elements, for instance a flexibly arranged projection. Preferably, the securing means comprises at least two snap elements, placed opposite to each other in a mirror image arrangement as a pair of snap elements, so as to create a space, for instance an opening, for the electrical device to be inserted, and so as to secure the electrical device in a sturdy manner to the inner body. In an embodiment of the present invention, a plurality of securing means are arranged for receiving a plurality of electrical devices, for instance two or four. To this end, a plurality of pairs of snap elements may for instance be provided in different positions, each provided with a space, for instance an opening, between the pairs of snap elements. In an embodiment of the present invention, the securing means is arranged for receiving the electrical device in a plurality of alignments. The securing means is for instance provided with more pairs of snap elements than necessary for coupling an electrical device, for instance arranged in different alignments, for instance rotated in relation to each other about an axis parallel to the depth direction and having the same center of rotation, for instance having a rotation point in the middle between the holes provided for receiving the active conductive pins. This, in particular, several pairs of snap elements can be provided on a securing means, while the electrical device comprises only one pair of snap elements. This embodiment offers the advantage that the electrician can modify the alignment of the electrical device, for instance for leveling the electrical device, or for instance if a previously desired configuration of electrical devices, for instance two switches next to each other, needs to be changed, for instance to a switch and an electrical socket placed above each other with horizontal active conductive pins. In an embodiment of the present invention, the plurality of alignments are rotated 90° in relation to each other about an axis parallel to the depth direction. This embodiment is particularly advantageous in the example above, in which the configuration of electrical devices needs to be changed at a late stage, and the securing means only offers enough space for connecting two electrical devices. In the example in which two switches next to each other need to be converted to a switch and an electrical socket above each other, the outer body can for instance be rotated 90° in relation to the wall, after which two new electrical devices can be attached to the securing means in the correct configuration. In an embodiment of the present invention, the securing means integrally connects the electrical device to the inner body, for instance to the side wall or outer wall of the inner body. Integrally connecting the electrical device to the inner body, for instance het inseparably connecting the electrical device and the inner body, or the electrical device and the inner body being a single piece, offers the advantage that the conductive pins of the electrical device can be connected to the electrical wirings in a sturdy, for instance less fragile way. In particular, no snap elements are provided in that case. In an embodiment, the securing means comprises a cavity for allowing the electrical device to be moved to a more recessed position of the inner body.

In an embodiment of the present invention, the inner body further comprises a cable manager arranged for switching the electrical device using the electrical wiring. The electrical wiring is thereto connected to the cable manager, for instance by screwing, or connected using connectors, for instance using "Wago connectors". Switching the electrical device may be carried out in different ways, such as for instance, in the case of an electrical socket, by securing the electrical wiring against the conductive pins of the electrical device, or by coupling the conductive pins to an electrical path in the cable manager, and wherein the electrical path is connected to the electrical wiring. In the case of the switch, connecting the electrical device to the cable manager essentially entails positioning the switch in relation to the cable manager in such a way that when switching, the switch switches the circuitry provided in the cable manager, for instance op a PCB. Preferably, the cable manager is arranged in a recessed position in the inner body, for instance positioned below the securing means, for instance below the cavity provided by the securing means. In an embodiment, the inner body and the cable manager thereto comprise snap elements for removably connecting the cable manager and the inner body. In an alternative embodiment, the cable manager is integrally connected to the inner body. In an embodiment, the cable manager comprises a PCB, for instance connected to a connector provided with the snap elements for connecting the PCB to the inner body. In an embodiment, in particular when the electrical device is an electrical socket, the cable manager is provided with the earthing pin, for instance a pair of side earthing pins or a central earthing pin, in which case the electrical device is only provided with the active conductive pins and a recess for receiving the earthing pin. In an embodiment, in particular when the electrical device is an electrical socket, the cable manager comprises holes for receiving the conductive pins of the electrical device, in particular the active conductive pins if the cable manager itself is already provided with the earthing pin. In this embodiment, and in particular if the securing means allows the electrical device to be coupled, for instance removably, in a plurality of alignments, the cable manager may for instance be provided with more holes than necessary for coupling an electrical device, for instance arranged in different alignments, for instance rotated in relation to each other about an axis parallel to the depth direction and having the same center of rotation, for instance having a rotation point in the middle between the holes provided for receiving the active conductive pins. The electrician can then insert the conductive pins of the electrical device into the holes of the cable manager in a simple manner, in the desired alignment of the electrical device, without having to take into account the connection of the conductive pins to the electrical wiring.

In an embodiment of the present invention, the adjustment means comprise one of a protrusion and a set of indentations extending in the depth direction, and the side wall of the outer body is provided with the corresponding set of indentations extending in the depth direction and protrusion. In such an embodiment, the inner body can be moved in the depth direction in the outer body, for instance pressed inward and/or pulled outward, wherein the protrusion snaps along the series of indentations for establishing a fixed, though not permanent anchoring. In an embodiment of the present invention, the indentations are a series of openings. In an embodiment of the present invention, the indentations are elongated in the circumferential direction. In an embodiment, the elongated indentations are longer than the protrusions, as measured in the same direction. The elongated indentations then allow the protrusion to be placed in the elongated indentations in different positions along the circumferential direction. This embodiment is particularly advantageous if a minimal rotation of the inner body in relation to the outer body is to be allowed. In an embodiment of the present invention, the protrusion is arranged so that the protrusion is always pressed slightly toward the indentations, for instance by the protrusion being elastic is or by the protrusion being arranged resiliently. In this embodiment, moving the inner body in relation to the outer body in the depth direction requires a friction force to be overcome between the protrusion and the indentation. In a further embodiment of the present invention, the adjustment means are under the control of a second expansion control element, allowing the adjustment means to be radially moved, for instance retracted and/or expanded, in a controllable manner. Preferably, the second expansion control element thereto comprises a spring system arranged for radially expanding the adjustment means. In the present embodiment, moving the inner body in relation to the outer body in the depth direction requires a friction force to be overcome between the protrusion and the indentation to a lesser degree, as the protrusion can be removed from the indentations under the control of the second expansion control element by counteracting the resilient force of the spring system. In an embodiment of the present invention, the side wall of the inner body comprises the adjustment means. Preferably, the side wall of the inner body comprises a recess in which the adjustment means and the second control element are arranged.

The present invention also relates to a wall provided with the mounting box. In an embodiment of the present invention, the wall is one of a ceiling or a vertical wall. The wall may be made from different materials, for instance one of a brick wall, a plasterboard wall, a hollow wooden wall and a concrete wall.

The present invention also relates to a method for mounting an electrical device into a cavity in a wall. To that end, the method according to the present invention comprises the following steps:

providing a mounting box wherein the electrical device is attached to the inner body, working the wall so as to form the cavity provided with at least a side wall, installing the mounting box in the cavity with the expansion element in its resting state, bringing the expansion element into its securing state by means of the first expansion control element pushing the expansion element against the side wall of the cavity, moving the inner body in the depth direction in relation to the outer body so that the electrical device lies in a plane in which a finishing layer is to be located, and applying the finishing layer onto the wall.

As a result of the inner body being adjustable in the depth direction, the plasterer can easily adjust the depth location of the inner body within the outer body to the thickness of the finishing layer the plasterer wishes to apply to the wall, without having to remove the electrical device/inner body from the outer body. Another advantage of the method according to the present invention is that the electrical device can be placed into the finished wall in an unobtrusive way, since the plasterer can set the height as a function of the thickness of the finishing layer, so that no finishing plate is required and the electrical device does not end up recessed with respect to the finished wall. Moreover, the method of the present invention ensures that an expert, such as an electrician, can install the electrical device into the wall in a time-efficient manner. Thus, the electrician can easily install the outer body at a correct alignment, for instance level, into a cavity in the wall, since the electrical device together with the inner body has already been placed into the outer body, so that the electrician can perform a simple visual control of the correct alignment of the mounting box in the wall.

In an embodiment of the method according to the present invention, the finishing layer comprises a finishing material such as plaster or tiles. The thickness of the finishing layer strongly depends on the circumstances of the case at hand, such as the type of finishing material as well as the geometry of the wall. The finishing layer can be parallel to the wall, maar can also change thickness in a direction in the wall. The finishing layer may for instance show a gradient, so as to obtain, in the case of a wall that is not precisely perpendicular to its adjacent walls, a finished wall that is more precisely perpendicular to the adjacent walls.

In an embodiment of the method according to the present invention, applying a finishing layer of a given thickness onto the wall also comprises applying the finishing layer over the inner body, for instance over the outer wall of the inner body, wherein the electrical device remains free from the finishing material of the finishing layer. In an embodiment of the method according to the present invention, the plasterer, before applying the finishing layer, places a cover plate over the electrical device. The expert can then apply the finishing layer over the entire wall, including the cover plate. Afterwards, the expert can remove the cover plate from the electrical device, so as to obtain an electrical device that is flush with the finishing layer applied onto the wall.

DESCRIPTION OF THE FIGURES

The present invention will hereafter be described with respect to particular embodiments and with reference to certain drawings, but the invention is not limited thereto and is only limited by the claims. The drawings shown are only schematic depictions and are not limiting. In the drawings, the size of certain elements may be exaggerated, meaning that the parts in question are not drawn to scale, being for illustrative purposes only. The dimensions and the relative dimensions do not necessarily correspond to actual reductions to practice of the invention.

Furthermore, terms such as "first", "second", "third" and the like, in the description and in the claims, are used for distinguishing between similar elements and not necessarily for describing a sequential or chronological order. These terms are mutually interchangeable under appropriate circumstances and the embodiments of the invention can operate in other sequences than described or illustrated herein.

The term "comprising" and derivative terms, as used in the claims, should not be interpreted as being restricted to the means listed after these terms; they do not exclude other elements or steps. The terms in question should be interpreted as specifying the presence of the stated features, integers, steps or components as referred to, but does not preclude the presence or addition of one or more other features, integers, steps or components, or groups thereof. Thus, the scope of an expression such as "a device comprising means A and B" is not merely limited to devices consisting only of components A and B. What is meant is that with respect to the present invention, the only relevant components of the device are A and B.

Figure 1:
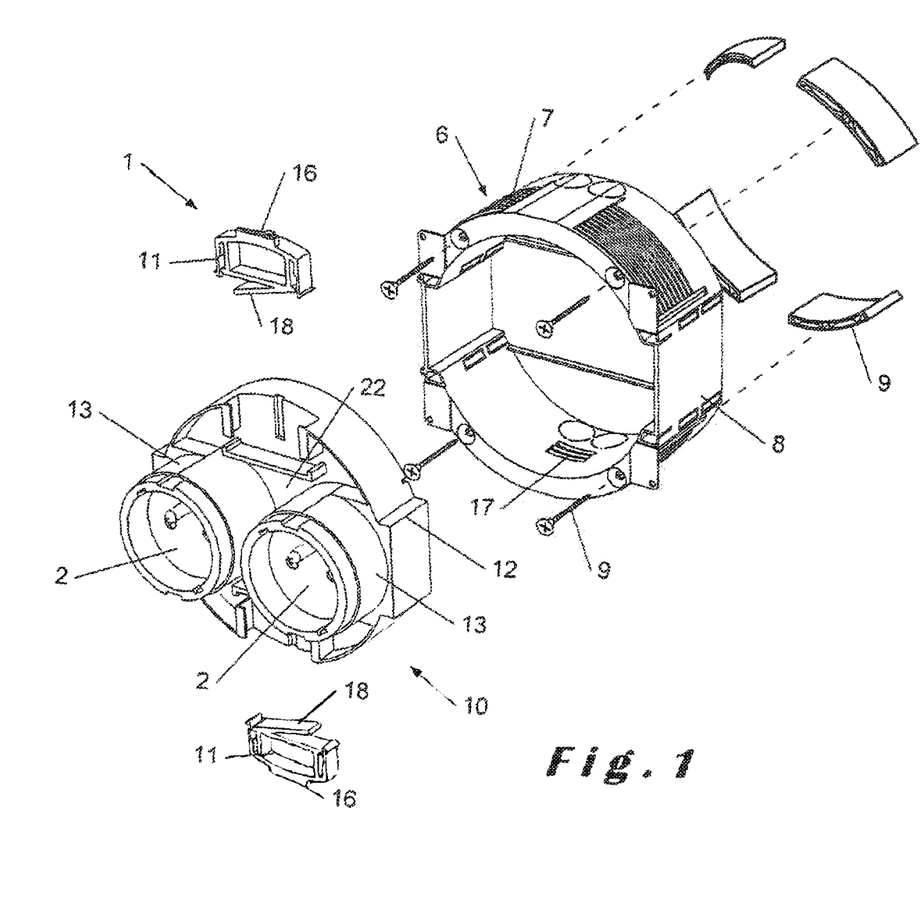
FIG. 1 shows a perspective view of the mounting box comprising an outer body and an inner body
Figure 2:
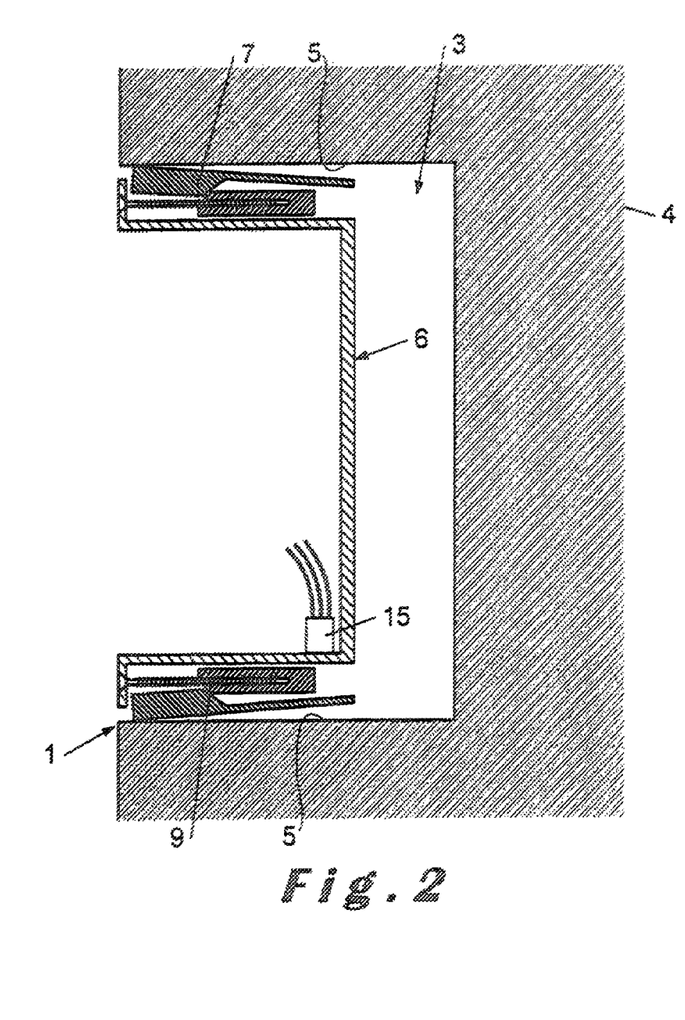
FIG. 2 shows a cross section of a side view of the mounting box from FIG. 1 which is built into a cavity of a wall and wherein only the outer body is anchored in the cavity

FIG. 1 shows a perspective view of the mounting box 1 comprising an outer body 6 and an inner body 10. As illustrated in FIG. 2, the mounting box 1 is arranged for mounting an electrical device 2 into a cylindrical cavity 3 of a wall 4, for instance a solid brick wall, wherein the cavity 3 is at least provided with a side wall 5. The electrical devices 2 in the present figure description are electrical sockets. However, the invention is not limited to electrical sockets, and the electrical device 2 may also be, for instance, a switch. Furthermore, it should be noted that the present invention has been described in reference to electrical devices 2. However, the invention is not limited to electrical devices 2, as the mounting box 1 of the present invention can also be used for installing other devices 2 into the cavity 3 of a wall 4 in a flush and unobtrusive way, in a time-saving manner, during the structural construction phase. Thus, the mounting boxes 1 of the present invention may for instance also be used for mounting sanitary mounting boxes, for connecting water conduits instead of electrical wirings. However, the invention preferably relates to mounting boxes 1 for mounting electrical devices 2.

Figure 9:
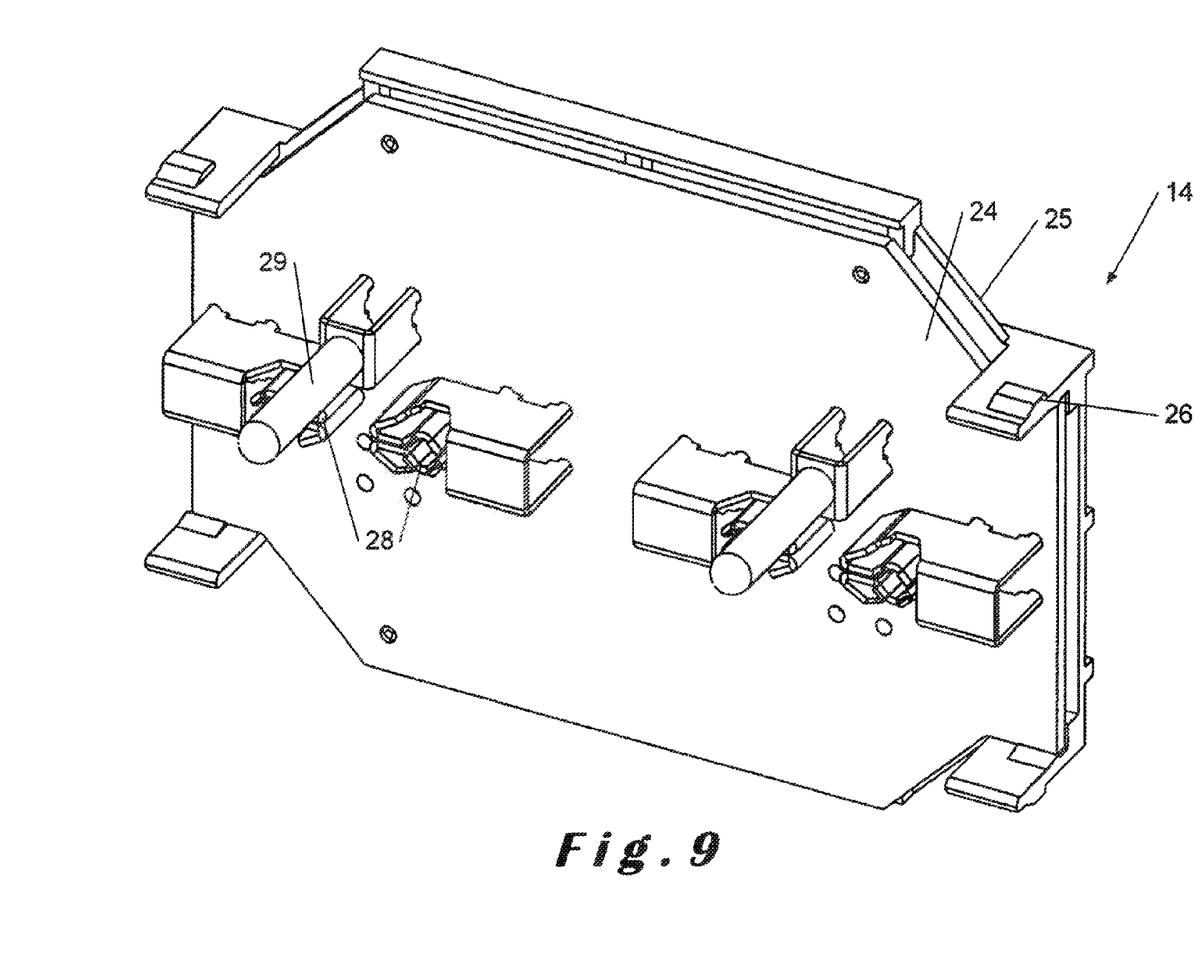
FIG. 9 shows a perspective view of the cable manager provided with a pin earthing
Figure 10:
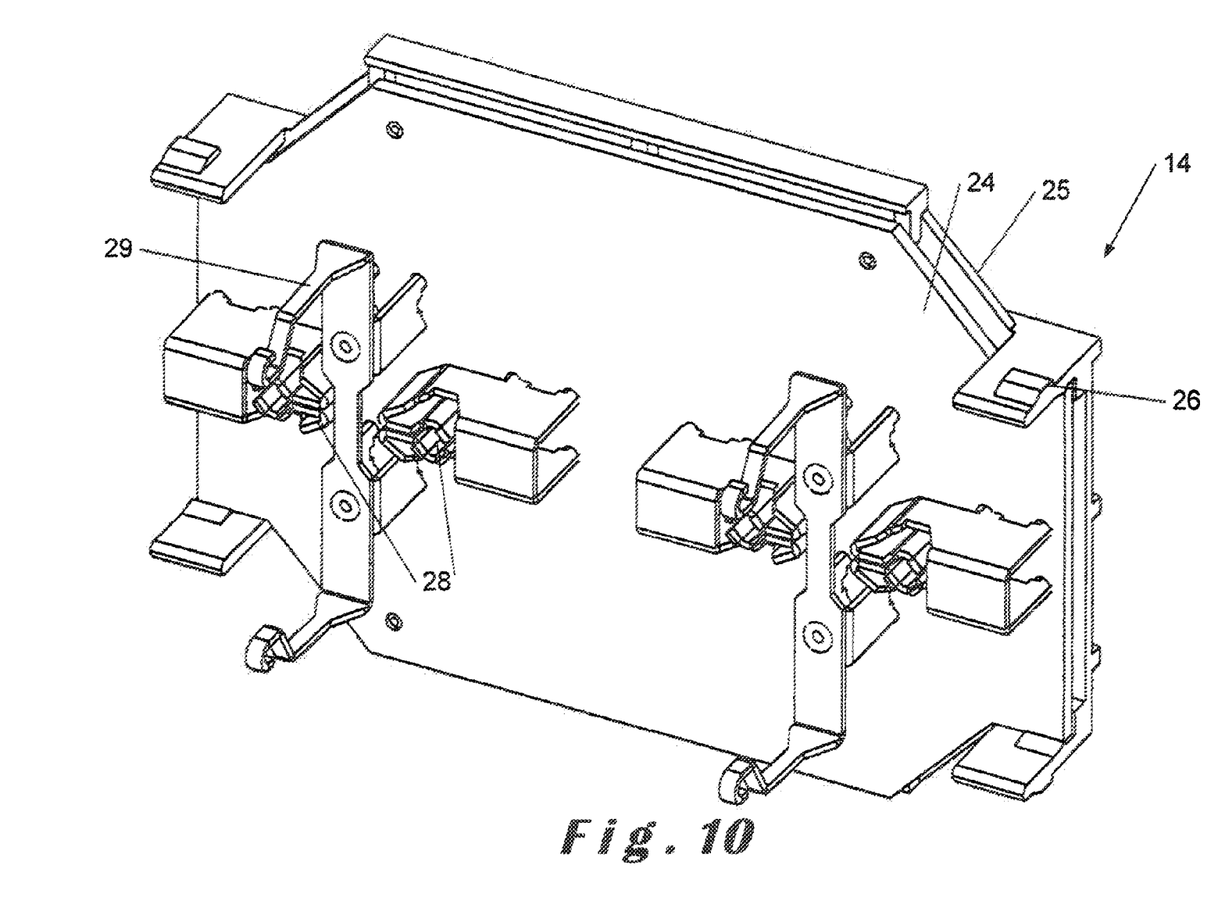
FIG. 10 shows a perspective view of an alternative cable manager provided with a side earthing
Figure 11:
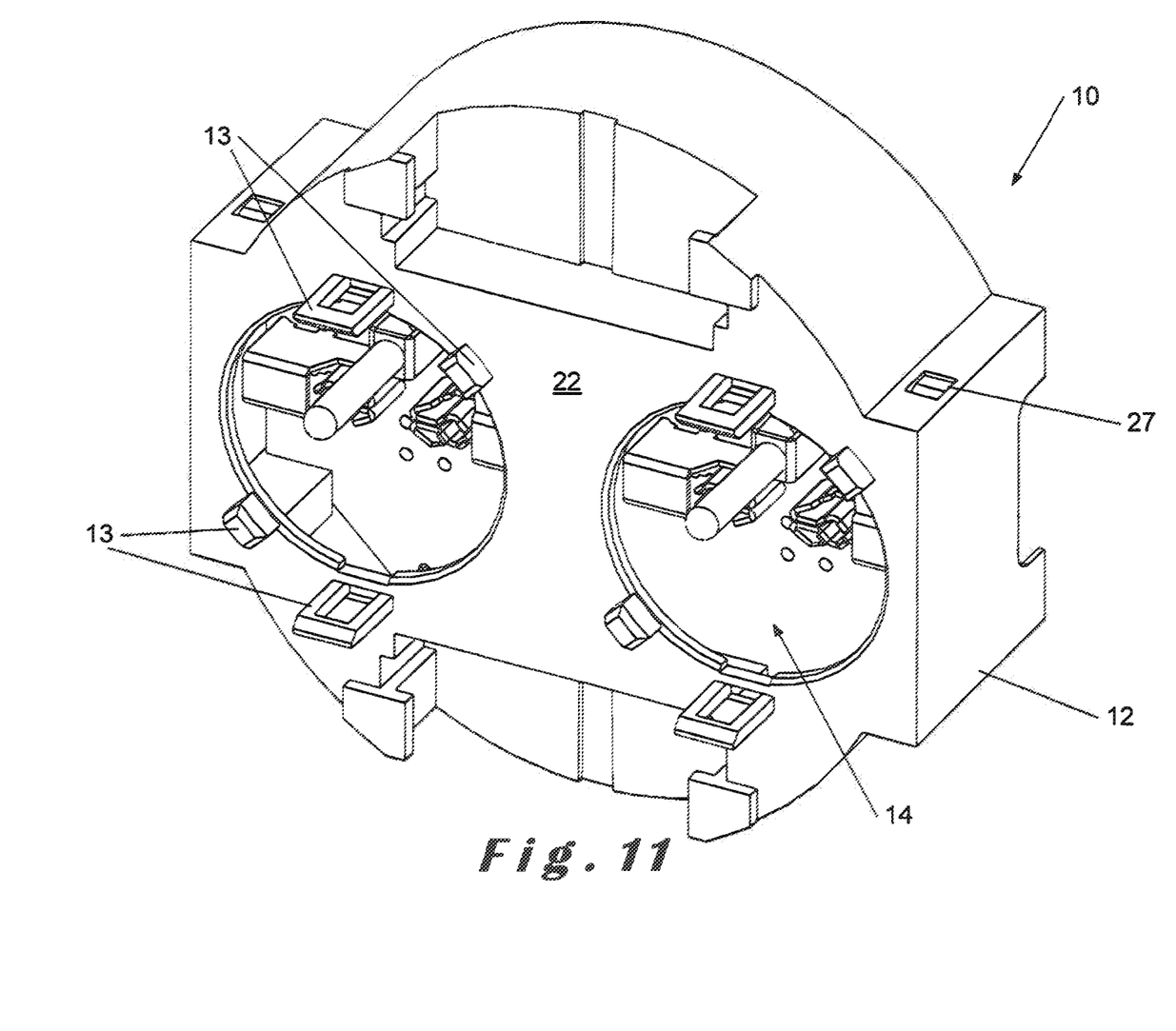
FIG. 11 shows a perspective view of an inner body provided with a further embodiment of securing means and provided with the cable manager from FIG. 9

As illustrated in FIG. 1, the mounting box 1 comprises an outer body 6 and an inner body 10. The outer body comprises four expansion elements 7 arranged in a substantially cylindrical side wall 8 that extends in a depth direction. The four expansion elements 7 are arranged in a regular pattern on the side wall 8 and differ from the side wall 8 by their grip-enhancing surface, provided with ridges. The expansion elements 7 are formed as cutouts in the side wall 8 and are only connected to the side wall 8 to a limited extent, preferably having a limited connection to a deeply set part of the side wall 8. The side wall 8 is preferably implemented as double, for instance concentric side walls. The expansion elements 7 are expandable under the control of the first expansion control element 9, of which one is provided for each expansion element 7 so as to control each expansion element 7 separately. The first expansion control elements 9 each comprise a screw and a pulling plate located under their respective expansion element 7, and preferably between the double side walls 8. To this end, the outer body 6 is provided with an opening for each expansion control element 9, into which the screw can be inserted, after which the screw is screwed into the pulling plate. In an alternative embodiment, not shown, the first expansion control elements 9 each comprise a striker pin and a pushing plate located under their respective expansion element 7 and preferably between the double side wall 8, and the outer body 6 is provided with an opening for each expansion control element 9, into which the striker pin can be inserted, after which the striker pin presses against the pushing plate. The outer body 6 further comprises two sets of openings 17, the openings extending in the circumferential direction and the sets extending in the depth direction, arranged for adjustably anchoring the inner body 10. Furthermore, the outer body 6 is provided with four flaps that are able to be pressed outward, each covering an opening. As shown in FIG. 2, the outward pressable flaps can be pressed outward for opening the covered opening, so that the electrical wiring 15 can then be pulled into the outer body 6 from the cavity 3 in the wall 4, and coming from a trench in the wall 4 (not shown). FIG. 1 shows the inner body 10, comprising a substantially cylindrical side wall 12 and an outer wall 22 connected to the side wall 12. The side wall 12 has a shape that is substantially congruous to the shape of the side wall 8 of the outer body 6, so as to create a minimal gap between the side walls, wherein, for instance, for the inner body 10 in relation to the outer body 6, only a translation movement in the depth direction is enabled, and wherein translation movements in other directions, as well as rotation movements, are prevented. The rotation movement is thereby prevented in particular by providing side walls 8, 12 having an imperfect cylindrical shape, for instance a cylindrical shape provided with lateral protrusions or a shape having an oval cross section in a plane having a normal according to the depth direction. For anchoring the inner body 10 to the outer body 6 in a height-adjustable way, the inner body is provided with two adjustment means 11. The adjustment means are provided in two recesses in the side wall 12 of the inner body 10. A spring system 18 permanently pushes the adjusting element 11 radially outward. The side walls 8, 12 are dimensioned so that a protrusion 16 provided on the adjusting element 11, located in the recess of the side wall 12 of the inner body 10, presses against the side wall 8 of the outer body under the influence of the resilient force of the spring system 18, and that the protrusion 16 does not press against the side wall 8 of the outer body 6 when the resilient force is counteracted, for instance as a result of the electrician pressing the adjusting element 11 radially inward. The inner body 10 is further provided with two securing means 13 arranged on the outer wall 22 of the inner body 10. The securing means 13 are arranged for securing the electrical devices 2 to the inner body 10. The electrical device 2, in particular the electrical socket, is provided with two active conductive pins and an opening arranged for receiving an earthing pin. As shown in FIG. 2, the inner body 10 comprises a cable manager 14 comprising holes for receiving the active conductive pins, as well as the earthing pin. The cable manager 14 is further connected to the electrical wiring 15. The FIGS. 9-11 show other embodiments of the securing means 13 and the cable manager 14.

Figure 3:
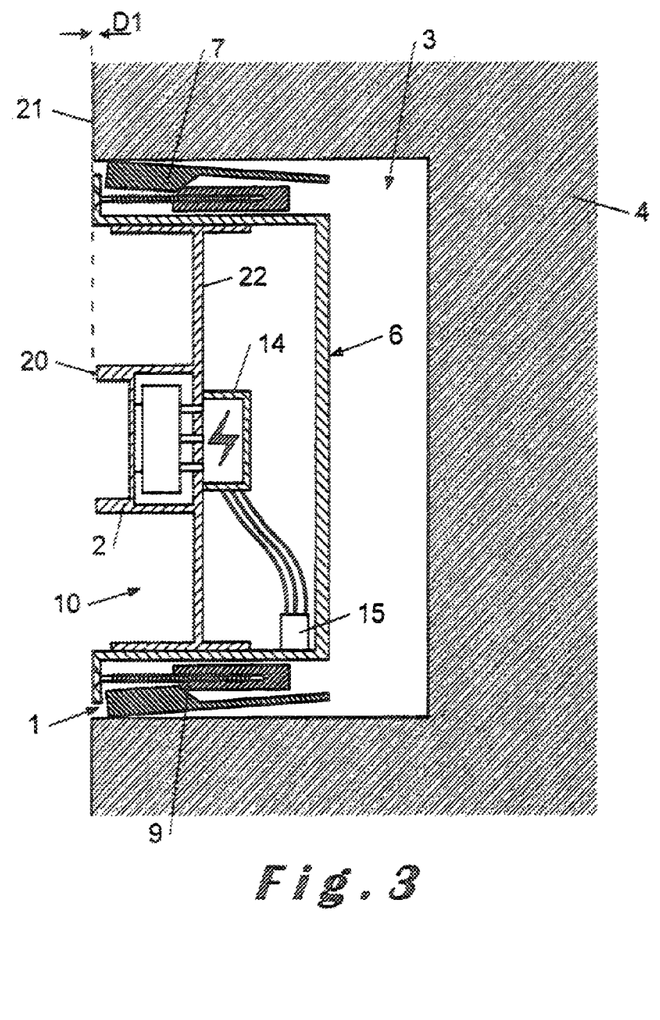
FIG. 3 shows a cross section of a side view of the mounting box from FIG. 1 which is built into a cavity of a wall as shown in FIG. 2 and wherein the inner body is inserted into the outer body at a first depth position
Figure 4:
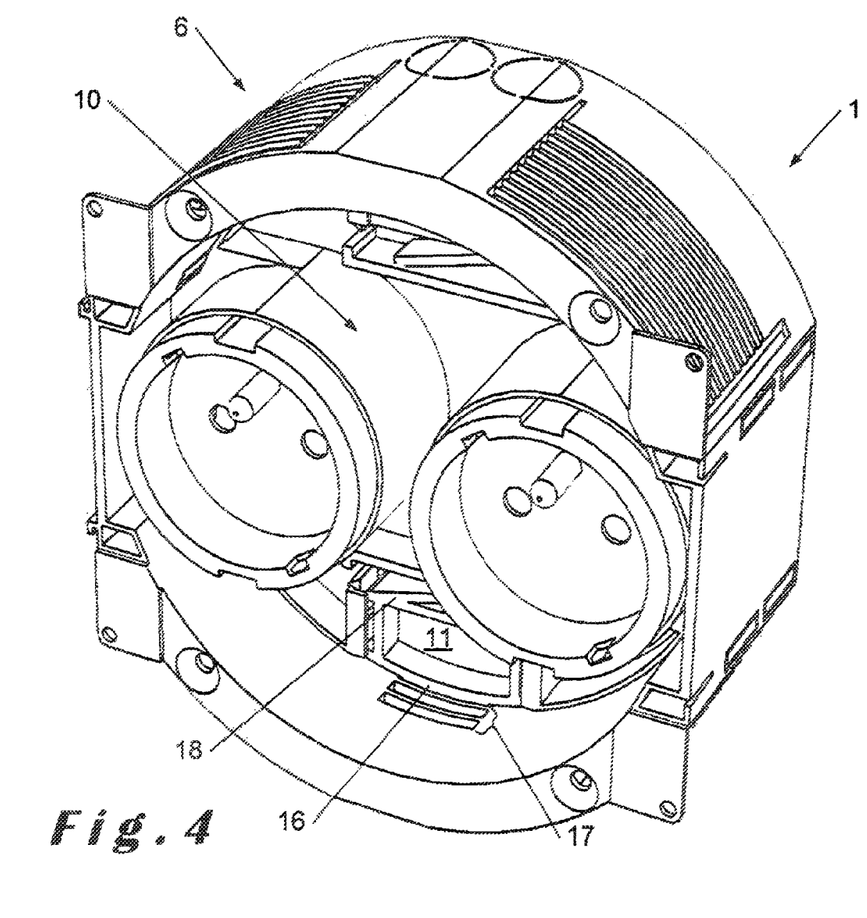
FIG. 4 shows a perspective view of the mounting box from FIG. 1, wherein the inner body is inserted into the outer body at a first depth position as shown in FIG. 3

The FIGS. 2-3 and 5-8 show the process in which the electrical device 2 is mounted into the cavity 3 of the wall 4. The figures show the mounting box 1, the cavity 3 and the wall 4 in a cross section through the mounting box 1 at a position through two expansion elements 7. The steps illustrated in the FIGS. 2-4 are executed by a first expert, such as an electrician, and the steps illustrated in the FIGS. 5-8 are carried out by a second expert, such as a plasterer. After a stone grinder has cut out the cavity 3 and the trenches in the wall 4, the electrician arrives on site. The electrician places the outer body 6 into the cavity 3 of the wall 4. To get the outer body 6 into the cavity, the expansion elements 7 should be in a non-expanded condition, in particular the resting state, wherein the expansion elements 7 are located substantially in the plane of the side wall 12 of the outer body 6. To this end, the stone grinder should of course make the dimensions of the cavity 3 in the wall 4 sufficiently large for the outer body 6 to fit inside the cavity 3 in its non-expanded condition, in particular its resting state. Then, the electrician anchors the outer body 6 in the cavity 3 by controlling the expansion control elements 9 so that the expansion elements 7 expand and press against the side wall 15 of the cavity 3. To this end, the stone grinder should of course make the dimensions of the cavity 3 in the wall 4 sufficiently small so that the outer body 6, in its expanded condition, sufficiently presses against the side wall 15 of the cavity 3. For this reason, the supplier of the mounting boxes 1 preferably supplies an instruction leaflet to the user, in which the optimal dimensions of the cavity 3 are described depending on the purchased mounting box 1. As shown in FIG. 2, the electrician can control the expansion control elements 9 by tightening the screw, causing the pulling plate to be pulled toward the screw head. The expansion element 7 is dimensioned in such a way that it tapers along the depth direction. As the pulling plate is pulled upward, the pulling plate is drawn against the wider part of the expansion element 7, causing the expansion element 7 to be pushed radially outward. The electrician then applies the electrical wirings 15 in the trenches and pulls them through the opening in the outer body 6 into the outer body 6. As shown in FIG. 3, the electrician then places the inner body 10 inside the outer body 6. To this end, the electrician has to connect the electrical wiring 15 to the cable manager 14. Then, the electrician pressed the adjustment means 11 toward each other so as to counteract the resilient force of the spring system 18, making the inner body 10 fit inside in the outer body 6. The electrician sets the desired depth by inserting the protrusion 16 into one of the openings 17 in the set of openings 17. This is achieved by no longer counteracting the resilient force of the spring systems 18. As shown in FIG. 3, the inner body 10 was anchored inside the outer body 6 at such a depth that the outer edge 20, for instance the outermost part of the inner body 10, for instance the outer edge of the electrical device 2, ends up located at a perpendicular distance D1 from the wall 4. It is, however, not necessary for the outer body 6 to be already anchored inside the cavity 3 before the inner body 10 is placed inside the outer body 6. This anchoring can also be carried out, as is in fact preferred, after the inner body 10 has been placed inside the outer body 6. In that case, the electrician can adjust the alignment of the outer body 6 in the cavity 3 in a simple manner, for instance so that the inner body 10, and in particular the electrical devices 2 provided on the inner body 10, are leveled. The mounting box 1 with the inner body 10 placed inside the outer body 6, before the anchoring of the outer body 6 in the cavity 3, is shown in FIG. 4.

In a later phase of the construction work, in particular during the finishing phase, another expert arrives on site for applying a finishing layer 19 onto the wall 4. Thus, during the finishing phase, a plasterer can come on site for plastering the wall 4, wherein a finishing layer 19 of plaster is applied to the wall 4. Here, it is preferred that the electrical device 2 does not end up recessed with respect to the finishing layer 19. Rather, an unobtrusive placement of the electrical device 2 in the finishing layer 19 is preferred. It is particularly preferred that the outer edge 20 of the electrical device 2 becomes flush with the finishing layer 19, so as to obtain an unobtrusive and thus aesthetic finish. The plasterer thereto calculates the resulting thickness of the finishing layer 19 at the position of the electrical device 2, in particular at the position of the outer edge 20. The thickness of the finishing layer 19 can be a uniform thickness across the entire wall 4, wherein the finishing layer 19 forms a plane parallel to the wall 4, but it can also show a gradient across the wall 4. If the gradient is strong, the thickness of the finishing layer 19 at a first position of the outer edge 20 strongly differs from the thickness of the finishing layer 19 at a second position of the outer edge 20, for instance opposite to the first position. The plasterer, or another expert, such as the electrician, can then easily modify the alignment of the outer body 6, and thereby also the alignment of the inner body 10 and the electrical device 2 in relation to the previous alignment wherein the outer body 6 was placed inside the cavity 3 in such a way that the electrical device 2, in particular the entire outer edge 20, was flush with the wall 4. Thus, the plasterer can easily uncouple the outer body 6 from the side wall 15 of the cavity 3 by bringing the expansion elements 7 to their non-expanded condition, in particular their resting state, by controlling the expansion control elements 9. Then, the plasterer can give the outer body 6 a new alignment, for instance by placing it in the cavity 3 with its depth direction not parallel to the normal of the cavity 3 or of the wall 4, maar parallel to the normal of the finished layer 19. By re-expanding the expansion elements 7 by means of the expansion control elements 9, the outer body 6 is again anchored in the cavity 3. Due to the angled alignment of the outer body 6 in relation to the cavity 3, the expansion control elements 9 are preferably individually controllable, so that those expansion elements 7 that are positioned closest to the side wall 15 of the cavity 3, can be expanded to a lesser degree than the expansion elements 7 that are positioned further from the side wall 15 of the cavity 3. Preferably, the outer body thereto comprises at least two expansion elements 7, so as to optimally anchor the outer body 6 in the cavity 3 at an angled alignment. Preferably, the expansion elements 7 and expansion control elements 9 are thereto provided to expand in a controllable and continuous way, wherein the degree of expansion varies controllably between a non-expanded condition, in particular the resting state wherein the expansion elements 7 are substantially flush with the side wall 8 of the outer body 6, and a fully expanded condition, wherein the expansion elements 7 are maximally expanded. As a result of the continuous control of the degree of expansion, the mounting box 1 is optimally suited for creating different angled alignments of the outer body 6 in relation to the cavity 3. In a further embodiment, the outer body 6 is provided with 2 individual expansion control elements 9 arranged for individually controlling the expansion of two opposing individual expansion elements 7. In the embodiment, the expansion elements 7 are fixedly connected to the side wall 8 of the outer body 6 in at least one position, preferably at the deepest position on the side wall 8, and het opposing end of the expansion element 7, for instance at the least deep point of the expansion element 7, is arranged for contacting the side wall 15 of the cavity 3. Furthermore, the expansion elements 7 and expansion control elements 9 are preferably implemented in such a way that when expanding the expansion element 7, the angle between the expansion element 7 and the side wall 8 is increased by rotating the side wall 8 about an expansion rotation axis. Providing two opposing expansion elements 7 allows the plasterer, by changing the angles between the expansion elements 7 and the side wall 8 of the outer body 6, to rotate the outer body 6 about the expansion rotation axis. This allows the plasterer to individually expand the individual expansion elements 7 to a larger or lesser degree, in particular to expand one expansion element 7 more if the other, opposing expansion element 7 is expand less, wherein the outer body 6 remains clamped in the cavity 3 of the wall 4 during the alignment modification process. Preferably, the outer body 6 is provided with three regularly positioned and individually controllable expansion elements 7, to allow the outer body 6 to be controllably rotated in all directions apart from the rotation about the depth direction of the outer body 6. The present invention is not limited to this embodiment. Thus, the present invention also encompasses a mounting box 1 of which the outer body 6 comprises a plurality of non-rotatable expansion elements 7, but wherein the outer body 6 is held at a deep position in relation to the cavity 3 and wherein the non-rotatable expansion elements 7 are provided at a less deep position of the side wall 8 of the outer body 6, and wherein the non-rotatable expansion elements 7 are linearly expandable in relation to the side wall 8, so as to angle the outer body 6 in relation to the cavity 3.

Figure 5:
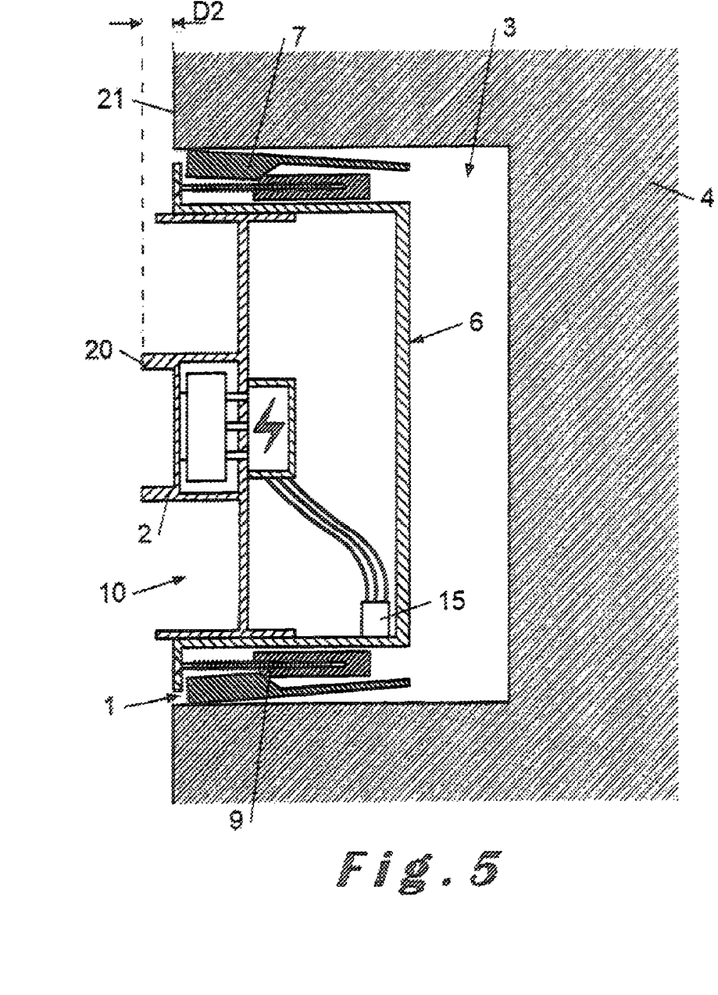
FIG. 5 shows a cross section of a side view of the mounting box from FIG. 1 which is built into a cavity of a wall as shown in FIG. 2 and wherein the inner body is inserted into the outer body at a second depth position
Figure 6:
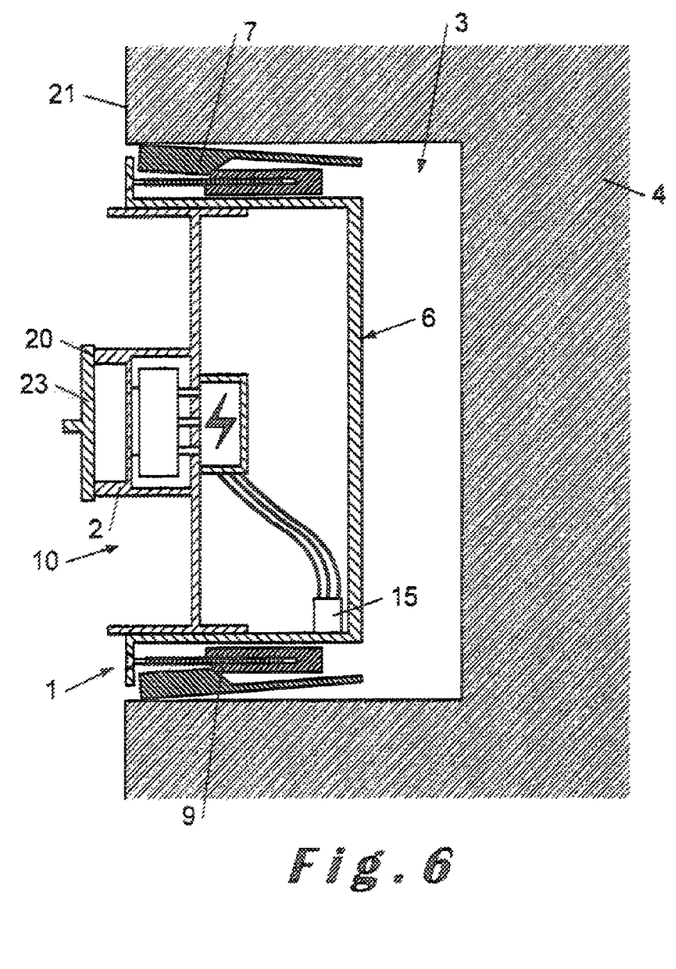
FIG. 6 shows a cross section of a side view of the mounting box from FIG. 1 in a configuration as shown in FIG. 5, wherein the cover plate has been applied
Figure 7:
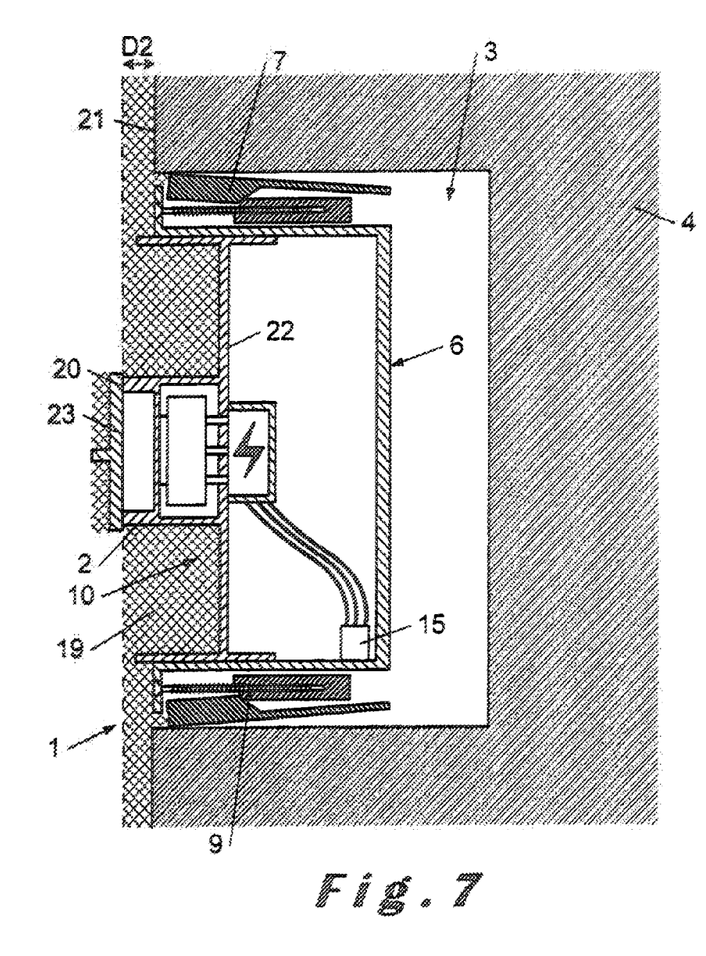
FIG. 7 shows a cross section of a side view of the mounting box from FIG. 1 in a configuration as shown in FIG. 6, wherein a finishing layer has been applied
Figure 8:
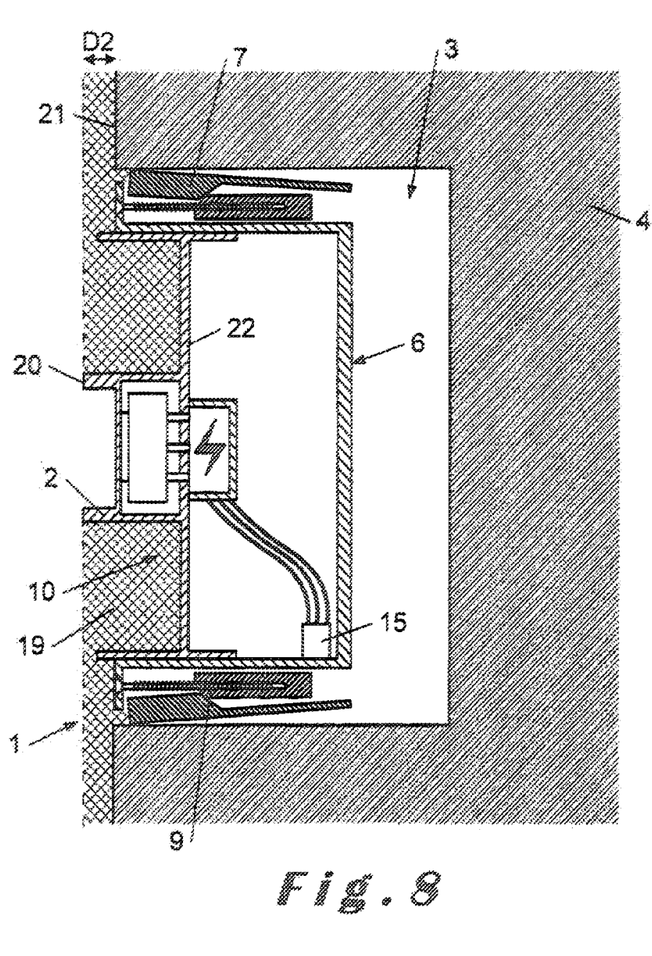
FIG. 8 shows a cross section of a side view of the mounting box from FIG. 1 in a configuration as shown in FIG. 7, wherein the cover plate has been removed

Once the outer body 6 has the correct alignment, the plasterer sets the correct depth of the inner body 10 by counteracting the resilient force exerted by the spring system 18, for instance by pressing the adjustment elements 11 together, translating the inner body 10 inside the outer body 6, and removing the counteracting force to insert the protrusion 18 into the correct opening 17. As shown in FIG. 5, this operation causes the electrical device 2, in particular the outer edge 20 of the electrical device 2, to be located at a height D2 of the wall 4. In the embodiment of FIG. 2, the finishing layer 19 will end up parallel to the plane of the wall 4, so that no realignment of the outer body was required and the electrical device 2, in particular the outer edge 20, is flush with the wall 4. As shown in FIG. 6, the plasterer then preferably places a protective cap 23 over the electrical device 2, in particular between (not shown) or over the outer edge 20. By installing the protective cap 23, the electrical device is protected against finishing material when applying the finishing layer 19. As shown in FIG. 7, the plasterer then applies the finishing layer 19 to the wall 4, over the exposed part of the outer body 6, over the exposed part of the inner body 10 and optionally over the protective cap 23. In a final phase, as shown in FIG. 8, the plasterer removes the protective cap 23.

FIGS. 9-11 show particular embodiments of the cable manager 14. FIG. 11 particularly shows another embodiment of the securing means 13. FIG. 9 shows a first embodiment of the cable manager 14. The cable manager 14 preferably comprises a first part 24 provided with a PCB. The first part 24 further comprises the holes 28 for receiving the active conductive pins and for coupling the electrical device 2, in particular the electrical socket, to the electrical wiring 15. The electrical wiring is thereto connected to the first part 24. The first part further comprises an earthing pin 29, implemented as a central earthing pin. The electrical device 2, in particular the electrical socket, comprises an opening for passing through the earthing pin. The cable manager 14 further comprises a second part 25 arranged for releasably coupling the cable manager 14 to the inner body 10. The second part 25 thereto comprises a first coupling part 26, which is arranged for releasably coupling with a second coupling part 27 provided on the inner body, wherein the first and second coupling parts 26, 27 comprise complementary components, in particular a protrusion and an opening, respectively. FIG. 10 shows the cable manager 14 from FIG. 9, provided with an alternative earthing pin 29. The alternative earthing pin 29 comprises side earthing elements. Correspondingly, the electrical device 2, in particular the electrical socket, is provided with openings for passing through the side earthing pins. The choice between the cable manager 14 of FIG. 9 and that of FIG. 10 depends on the end use domain of the mounting box. FIG. 11 shows the inner body 10 coupled to the cable manager 14 from FIG. 9. FIG. 11 further shows another embodiment of the securing means 13. FIG. 11 shows two securing means 13, for coupling two electrical devices 2, in particular two electrical sockets, horizontally next to each other. The securing means 13 are each provided with an opening, which allows access of the electrical device 2 to the cable manager 14. The securing means 13 are each provided with one pair of opposing snap elements, which are arranged for snapping with a corresponding pair of snap elements provided on the electrical device 2. The securing means 13 further each comprise positioning blocks, which prevent the translation of the electrical device 2 in a different direction from the direction connecting the two opposing snap elements. The positioning blocks thus reduce the risk of the snap elements breaking off, for instance as a result of such a translation movement.

The invention claimed is:

1. A mounting box for mounting an electrical device into a cavity of a wall, wherein the cavity comprises a side wall, the mounting box comprising:
    an outer body comprising a plurality of expansion elements provided in the side wall and extending in a depth direction, wherein each expansion element is configured for being pressed against the side wall of the cavity, and a first expansion control element configured for pressing each expansion element against the side wall of the cavity from a resting state to a securing state, wherein the expansion elements are individually controllable by the expansion control element, and
    an inner body configured to be mounted into the outer body and configured for receiving the electrical device, wherein the inner body comprises adjustment means configured for moving the inner body in the depth direction inside the outer body.

2. The mounting box according to claim 1, wherein the adjustment means are configured to allow an axial rotation of the inner body in relation to the outer body of less than 30 degrees.

3. The mounting box according to claim 1, wherein the adjustment means positions the inner body non-rotatably in relation to the outer body.

4. The mounting box according to claim 1, wherein the inner body comprises a side wall extending in the depth direction, and wherein the inner body comprises securing means for securing the electrical device.

5. The mounting box according to claim 4, wherein the securing means is configured receive the electrical device in a plurality of alignments.

6. The mounting box according to claim 5, wherein each of the plurality of alignments is rotated 90° in relation to each other about an axis parallel to the depth direction.

7. The mounting box according to claim 5, wherein the inner body further comprises a cable manager configured for switching the electrical device using electrical wiring.

8. The mounting box according to claim 7, wherein the cable manager switches the electrical device in the plurality of alignments using the electrical wiring.

9. The mounting box according to claim 4, wherein the securing means integrally connect the electrical device to the inner body.

10. The mounting box according to claim 4, wherein the side wall of the inner body comprises the adjustment means.

11. The mounting box according to claim 1, wherein the adjustment means comprise one of a protrusion or a set of indentations extending in the depth direction, and wherein the side wall of the outer body is provided with a corresponding set of indentations extending in the depth direction.

12. The mounting box according to claim 11, wherein the adjustment means are radially expandable under control of a second expansion control element.

13. The mounting box according to claim 12, wherein the second expansion control element comprises a spring system configured for radially expanding the adjustment means.

14. The mounting box according to claim 1, wherein the expansion element comprises a grip-enhancing surface.

15. A wall comprising the mounting box according to claim 1.

16. A method for mounting an electrical device into a cavity in a wall, the method comprising:
    providing a mounting box according to claim 1, wherein the electrical device is attached to the inner body;
    forming the cavity, the cavity provided with at least a side wall;
    installing the mounting box in the cavity with the expansion element in a resting state;
    bringing the expansion element into a securing state by the first expansion control element pushing the expansion element against the side wall of the cavity;
    moving the inner body in the depth direction in relation to the outer body so that the electrical device lies in a plane in which a finishing layer is to be located; and
    applying the finishing layer onto the wall.

* * * * *